(12) United States Patent
Fujita et al.

(10) Patent No.: US 11,792,571 B2
(45) Date of Patent: Oct. 17, 2023

(54) FILTER GENERATION APPARATUS AND RECORDING MEDIUM

(71) Applicant: Faurecia Clarion Electronics Co., Ltd., Saitama (JP)

(72) Inventors: Yasuhiro Fujita, Saitama (JP); Takeshi Hashimoto, Saitama (JP); Tetsuo Watanabe, Saitama (JP)

(73) Assignee: Faurecia Clarion Electronics Co., Ltd., Saitama (JP)

(*) Notice: Subject to any disclaimer, the term of this patent is extended or adjusted under 35 U.S.C. 154(b) by 153 days.

(21) Appl. No.: 17/547,415

(22) Filed: Dec. 10, 2021

(65) Prior Publication Data
US 2022/0201396 A1 Jun. 23, 2022

(30) Foreign Application Priority Data
Dec. 17, 2020 (JP) ................. 2020-209308

(51) Int. Cl.
*H04R 3/04* (2006.01)
*G06F 17/14* (2006.01)

(52) U.S. Cl.
CPC ............. *H04R 3/04* (2013.01); *G06F 17/142* (2013.01)

(58) Field of Classification Search
CPC ................. H04R 3/04; G06F 17/142
See application file for complete search history.

(56) References Cited

U.S. PATENT DOCUMENTS

2017/0026771 A1* 1/2017 Shuang ............... H04S 7/306
2018/0019720 A1 1/2018 Hashimoto et al.

FOREIGN PATENT DOCUMENTS

JP 2016-163187 A 9/2016

\* cited by examiner

*Primary Examiner* — Andrew L Sniezek
(74) *Attorney, Agent, or Firm* — IP BUSINESS SOLUTIONS, LLC

(57) ABSTRACT

A filter generation apparatus includes: a coefficient calculation unit that performs IFFT on a frequency characteristic of a frequency domain filter and calculates a filter coefficient of a linear phase FIR filter; a conversion unit that converts the filter coefficient to a filter coefficient of a minimum phase FIR filter; a coefficient generation unit that generates a filter coefficient of an approximation filter by executing cut-out processing to a filter length set by a filter length setting unit and rounding processing performed by a window function on the filter coefficient; an error calculation unit that calculates an error of a frequency characteristic corresponding to the approximation filter with respect to the frequency characteristic of the frequency domain filter; and a filter storage unit that stores the filter coefficient therein as a filter coefficient that specifies a new filter when the error is equal to or less than a predetermined threshold value.

8 Claims, 11 Drawing Sheets

FIG.3
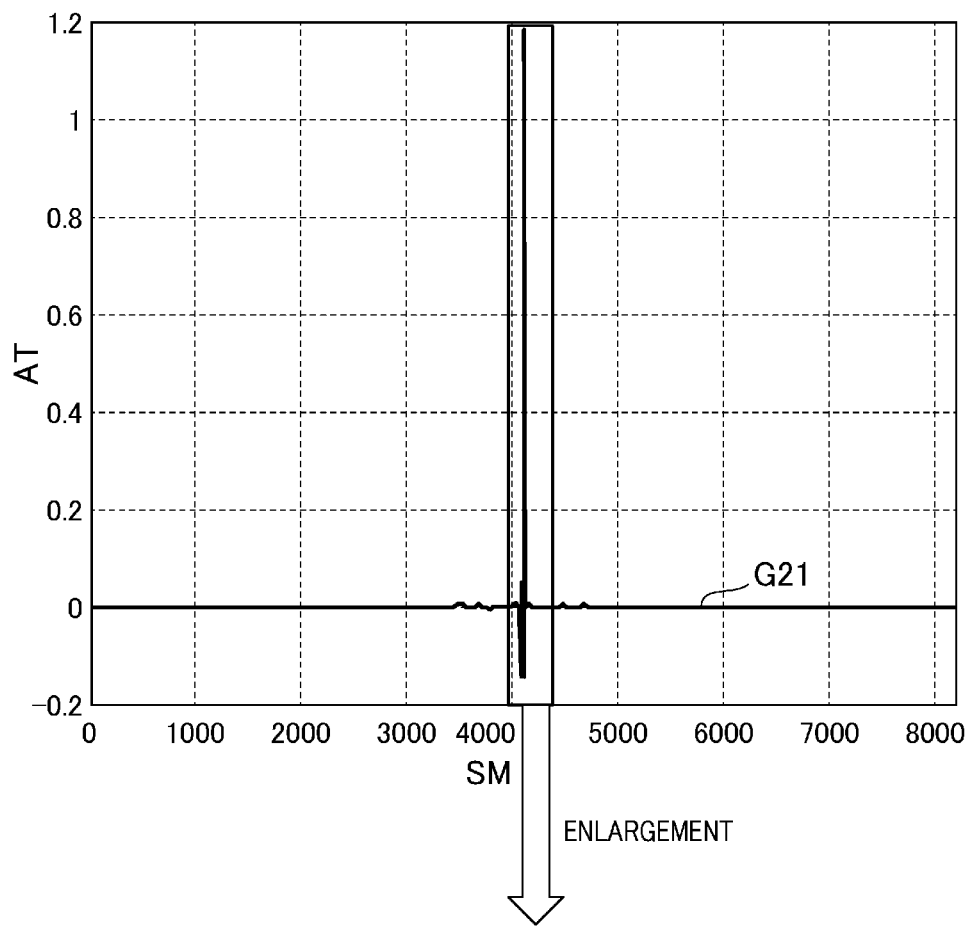
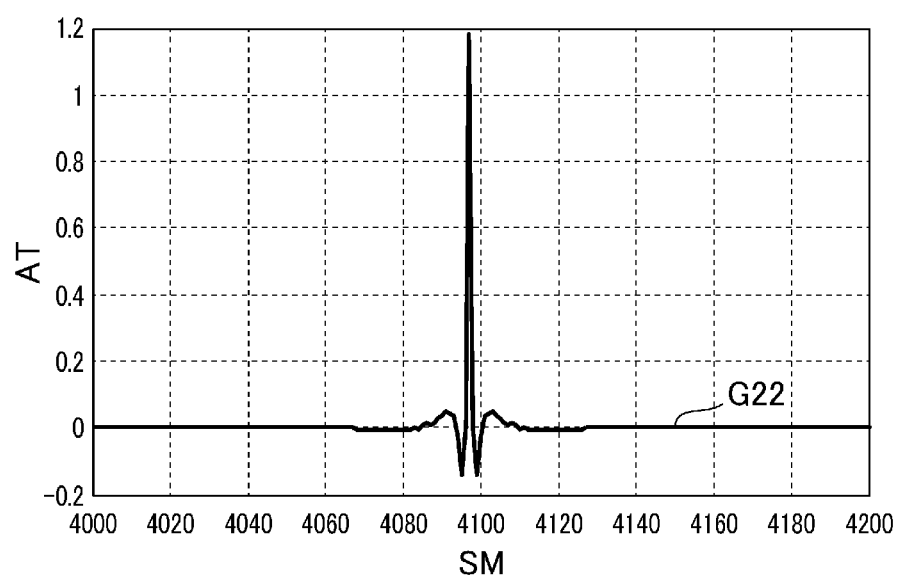

FIG.4
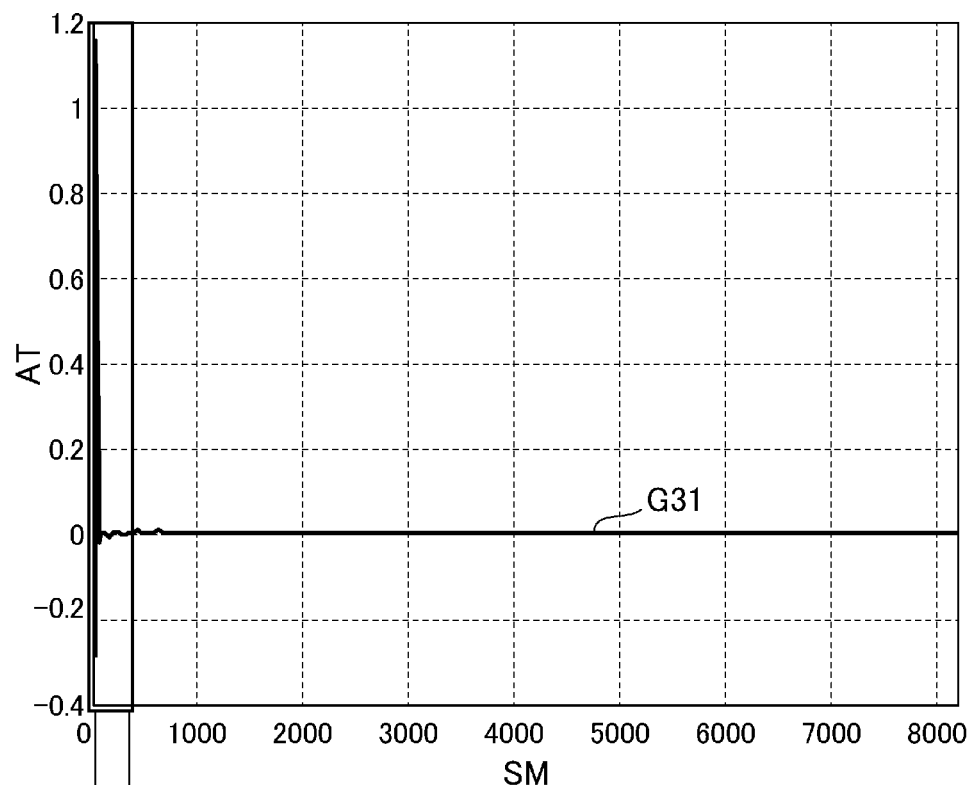
ENLARGEMENT
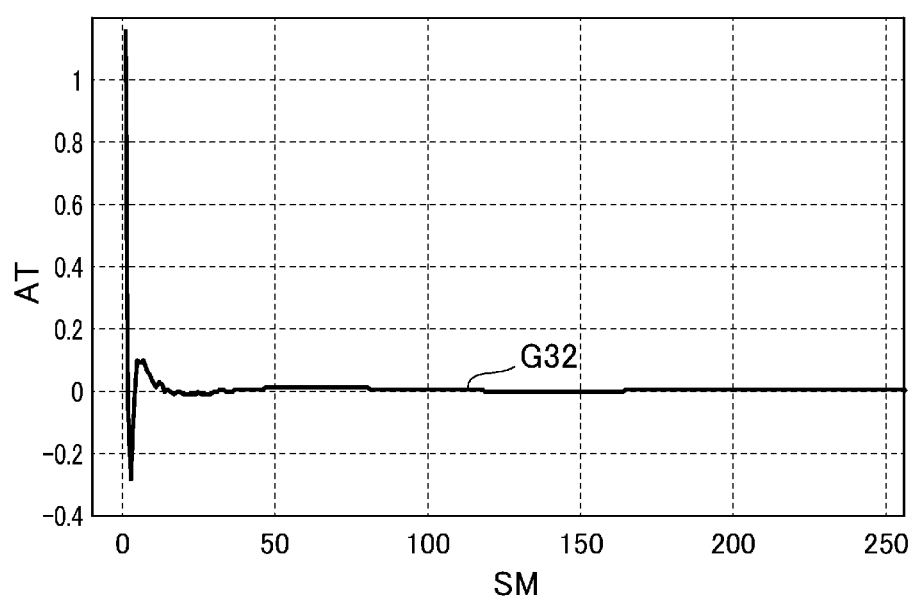

FIG.9
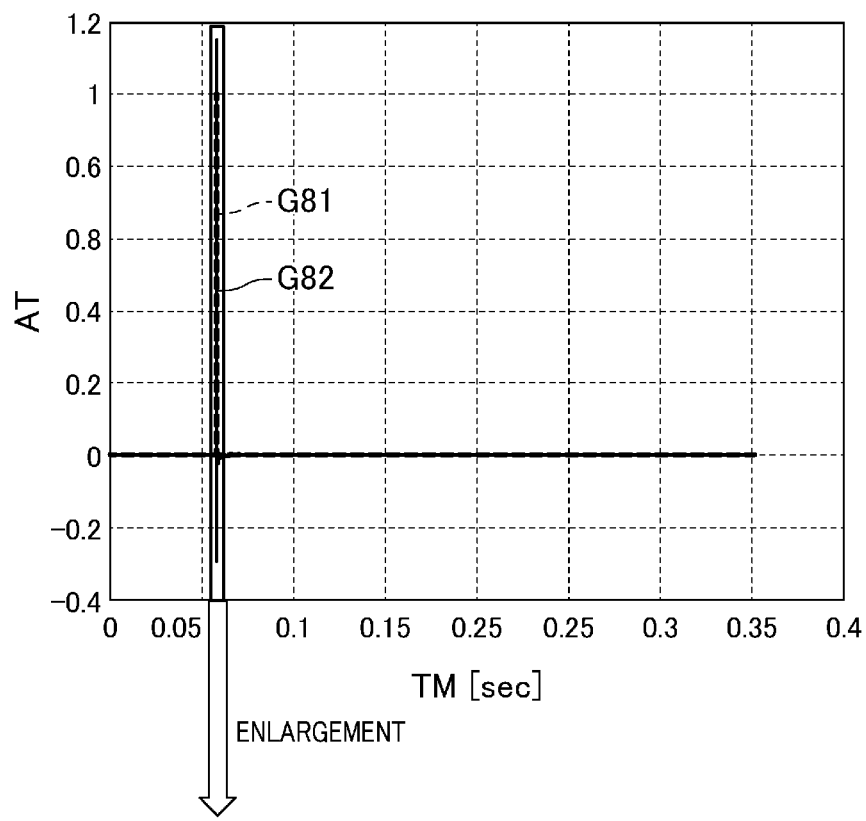
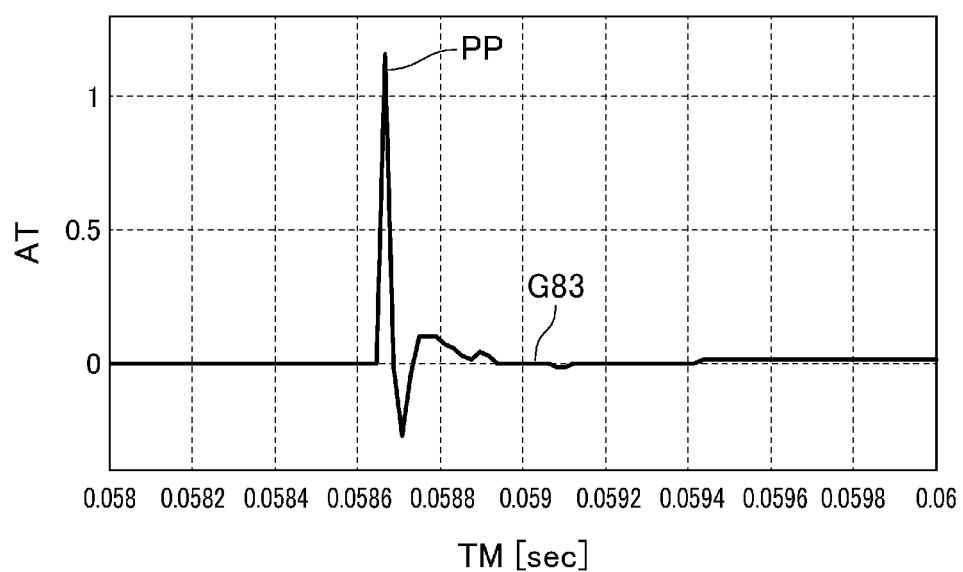

FIG.11
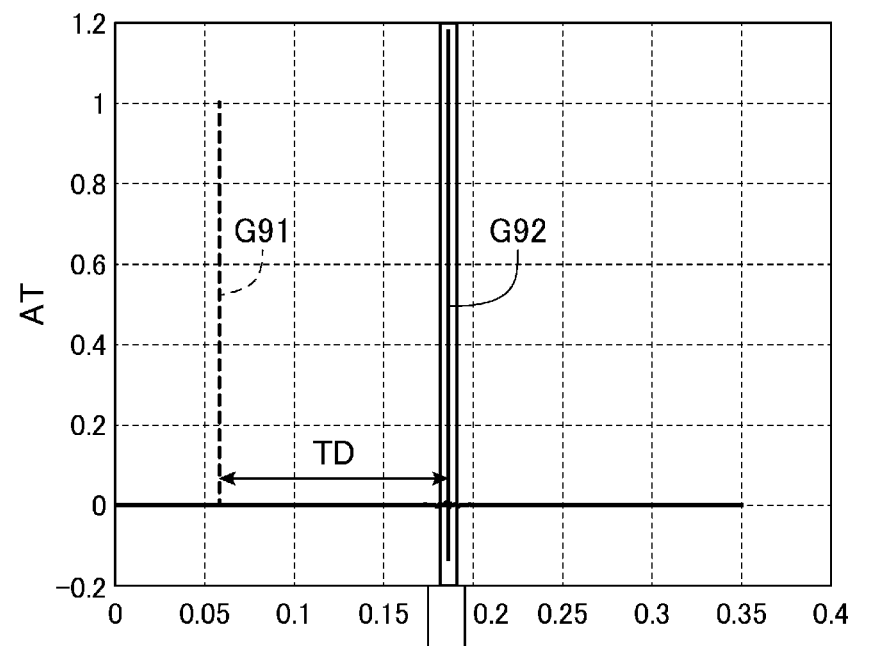
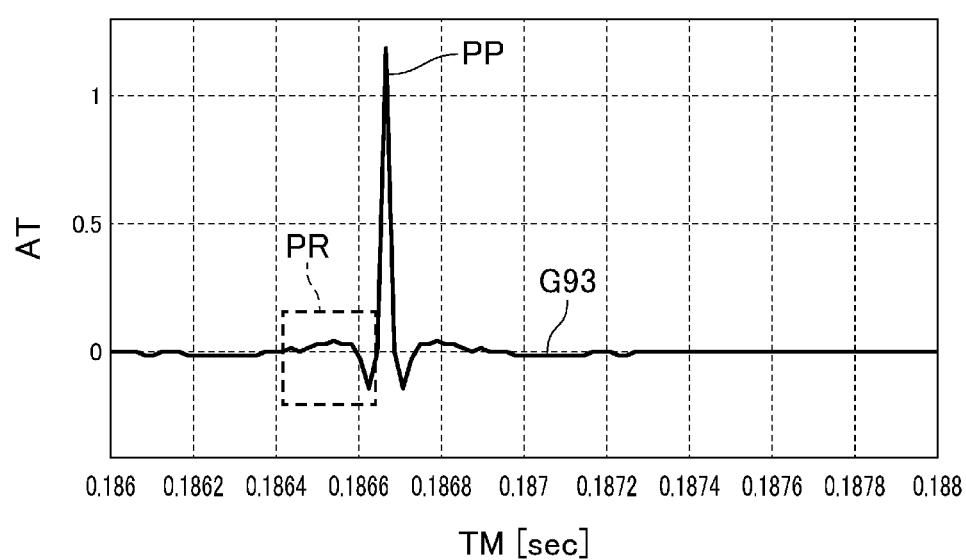

FILTER GENERATION APPARATUS AND RECORDING MEDIUM

INCORPORATION BY REFERENCE

The present application claims priority under 35 U.S.C. § 119 to Japanese Patent Application No. 2020-209308 filed on Dec. 17, 2020. The content of the application is incorporated herein by reference in its entirety.

BACKGROUND OF THE INVENTION

Field of the Invention

The present invention relates to a filter generation apparatus and a recording medium.

Description of the Related Art

Hitherto, a filter generation apparatus that generates a filter that corrects an audio signal has been disclosed in Japanese Patent Laid-Open No. 2016-163187, for example.

The filter generation apparatus disclosed in Japanese Patent Laid-Open No. 2016-163187 generates an FIR filter capable of realizing set frequency and gain characteristics.

However, in recent years, it has become common to employ a multi-speaker system and also perform crossover processing. In this case, a function of the related-art filter disclosed in Japanese Patent Laid-Open No. 2016-163187 and the like is not sufficient, and a filter applied to a crossover function for the purpose of frequency band division associated with speaker output is also necessary in addition to amplitude correction for each band. Therefore, a memory capacity for storing each parameter in each processing becomes necessary.

An object of the present invention is to provide a filter generation apparatus and a filter generation program capable of reducing memory capacity.

SUMMARY OF THE INVENTION

In order to achieve the abovementioned object, a filter generation apparatus of an embodiment includes: a coefficient acquisition unit that acquires a filter coefficient that specifies a frequency characteristic of a frequency domain filter; a coefficient calculation unit that performs IFFT on the frequency characteristic and calculates a filter coefficient of a linear phase FIR filter of a time domain; a conversion unit that converts the filter coefficient of the linear phase FIR filter to a filter coefficient of a minimum phase FIR filter; a coefficient storage unit that stores the filter coefficient of the minimum phase FIR filter in the coefficient storage unit; a filter length setting unit that sets a filter length; a coefficient generation unit that generates a filter coefficient of an approximation filter by reading out the filter coefficient of the minimum phase FIR filter from the coefficient storage unit and executing cut-out processing to the filter length set by the filter length setting unit and rounding processing performed by a window function on the filter coefficient of the minimum phase FIR filter, the approximation filter approximating the minimum phase FIR filter; an error calculation unit that calculates an error of a frequency characteristic corresponding to the approximation filter with respect to the frequency characteristic of the frequency domain filter; and a filter storage unit that stores the filter coefficient of the approximation filter in the filter storage unit as a filter coefficient that specifies a new filter when the error is equal to or less than a predetermined threshold value.

In order to achieve the abovementioned object, a non-transitory computer-readable recording medium of the present embodiment has a filter generation program executed by a processor of a computer recorded on the non-transitory computer-readable recording medium, and the filter generation program causes the processor to function as: a coefficient acquisition unit that acquires a filter coefficient that specifies a frequency characteristic of a frequency domain filter; a coefficient calculation unit that performs IFFT on the frequency characteristic and calculates a filter coefficient of a linear phase FIR filter of a time domain; a conversion unit that converts the filter coefficient of the linear phase FIR filter to a filter coefficient of a minimum phase FIR filter; a coefficient storage unit that stores the filter coefficient of the minimum phase FIR filter in the coefficient storage unit; a filter length setting unit that sets a filter length; a coefficient generation unit that generates a filter coefficient of an approximation filter by reading out the filter coefficient of the minimum phase FIR filter from the coefficient storage unit and executing cut-out processing to the filter length set by the filter length setting unit and rounding processing performed by a window function on the filter coefficient of the minimum phase FIR filter, the approximation filter approximating the minimum phase FIR filter; an error calculation unit that calculates an error of a frequency characteristic corresponding to the approximation filter with respect to the frequency characteristic of the frequency domain filter; and a filter storage unit that stores the filter coefficient of the approximation filter in the filter storage unit as a filter coefficient that specifies a new filter when the error is equal to or less than a predetermined threshold value.

According to the present embodiment, the capacity of the memory that stores the filter coefficient therein can be reduced.

BRIEF DESCRIPTION OF THE DRAWINGS

FIG. 3 shows graphs showing one example of a linear phase FIR filter;

FIG. 4 shows graphs showing one example of a minimum phase FIR filter;

FIG. 9 shows graphs showing one example of a filter processing result performed by an approximation filter;

FIG. 11 shows graphs showing one example of a filter processing result obtained by a related-art linear phase FIR filter.

DETAILED DESCRIPTION OF THE PREFERRED EMBODIMENT

An embodiment is described below with reference to the drawings.

Figure 1:
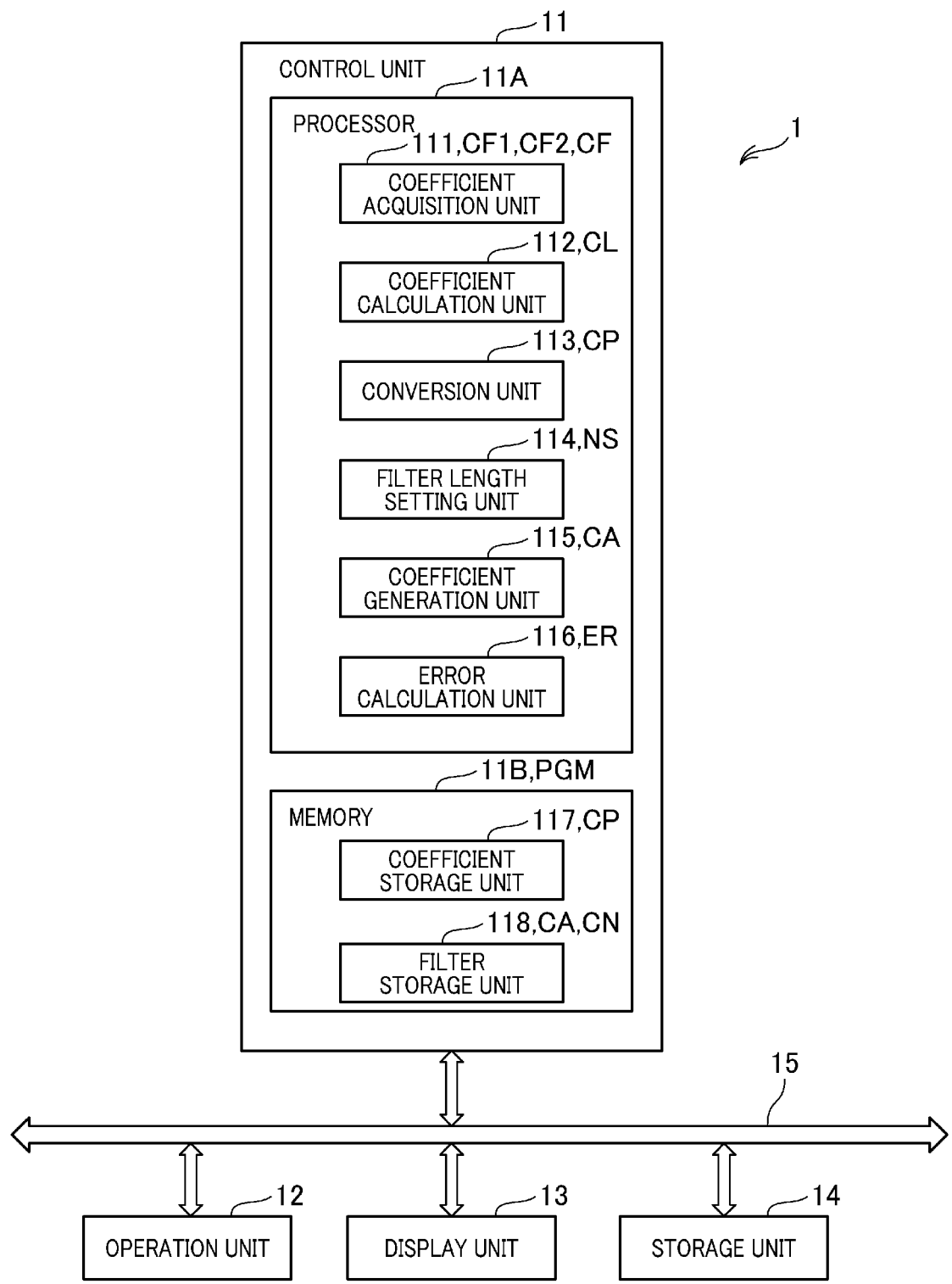
FIG. 1 is a diagram illustrating one example of a configuration of a filter generation apparatus according to an embodiment.

FIG. 1 is a diagram illustrating one example of a configuration of a filter generation apparatus 1 according to the present embodiment.

The filter generation apparatus 1 is configured by a personal computer, for example, and generates a filter coefficient CN of a new filter FN.

The filter coefficient CN is stored in an audio correction apparatus (not shown) mounted on a vehicle, for example. The audio correction apparatus corrects an audio signal input to an in-vehicle speaker with use of the filter coefficient CN.

The filter FN is described below in the description of a configuration of a control unit 11 of the filter generation apparatus 1.

As illustrated in FIG. 1, the filter generation apparatus 1 includes the control unit 11, an operation unit 12, a display unit 13, and a storage unit 14.

The control unit 11, the operation unit 12, the display unit 13, and the storage unit 14 are configured to be able to communicate with each other via an internal bus 15.

The operation unit 12 is configured by a keyboard and a mouse, for example, and accepts an operation from a user and outputs an operation signal to the control unit 11.

The display unit 13 is a display configured by a liquid crystal display (LCD), for example, and displays various images in accordance with an instruction from the control unit 11.

The storage unit 14 is configured by a hard disk drive (HDD) and a solid state drive (SSD), for example, and stores various information therein.

The control unit 11 includes a processor 11A such as a central processing unit (CPU) and a micro-processing unit (MPU), and a memory 11B such as a read only memory (ROM) and a random access memory (RAM). The memory 11B stores a control program PGM therein.

The control unit 11 corresponds to one example of a "computer".

The control program PGM corresponds to one example of a "filter generation program".

The control unit 11 includes a coefficient acquisition unit 111, a coefficient calculation unit 112, a conversion unit 113, a filter length setting unit 114, a coefficient generation unit 115, an error calculation unit 116, a coefficient storage unit 117, and a filter storage unit 118.

Specifically, the processor 11A of the control unit 11 functions as the coefficient acquisition unit 111, the coefficient calculation unit 112, the conversion unit 113, the filter length setting unit 114, the coefficient generation unit 115, and the error calculation unit 116 by executing the control program PGM stored in the memory 11B. The processor 11A of the control unit 11 causes the memory 11B to function as the coefficient storage unit 117 and the filter storage unit 118 by executing the control program PGM stored in the memory 11B.

The coefficient storage unit 117 stores a filter coefficient CP of a minimum phase finite impulse response (FIR) filter FP therein. The filter coefficient CP of the minimum phase FIR filter FP is generated by the conversion unit 113.

The filter storage unit 118 stores a filter coefficient CA of an approximation filter FA therein as the filter coefficient CN that specifies the new filter FN. The approximation filter FA is generated by the coefficient generation unit 115.

The coefficient acquisition unit 111 acquires a filter coefficient CF that specifies a frequency characteristic of a frequency domain filter FF. Specifically, the coefficient acquisition unit 111 calculates the filter coefficient CF by multiplying a filter coefficient CF1 that specifies a frequency characteristic of a first frequency domain filter FF1 and a filter coefficient CF2 that specifies a frequency characteristic of a second frequency domain filter FF2 different from the first frequency domain filter FF1 together for each corresponding frequency.

Processing of the coefficient acquisition unit 111 is described with reference to FIG. 2.

The coefficient calculation unit 112 performs inverse fast Fourier transform (IFFT) on the frequency characteristic of the frequency domain filter FF and calculates the filter coefficient CL of the linear phase FIR filter FL of a time domain.

Processing of the coefficient calculation unit 112 is described with reference to FIG. 2 and FIG. 3.

The conversion unit 113 converts the filter coefficient CL of the linear phase FIR filter FL to the filter coefficient CP of the minimum phase FIR filter FP.

Processing of the conversion unit 113 is described with reference to FIG. 3 and FIG. 4.

The filter length setting unit 114 sets a filter length NS. The filter length setting unit 114 sets the filter length NS that is longer than the filter length NS that is previously set, for example.

In the present embodiment, the filter length NS indicates the number of coefficients configuring the filter coefficient CA of the approximation filter FA. The filter length NS is, for example, 256, 512, 1024, 2048, or the like.

The coefficient generation unit 115 generates the filter coefficient CA of the approximation filter FA that approximates the minimum phase FIR filter FP by reading out the filter coefficient CP of the minimum phase FIR filter FP from the coefficient storage unit 117 and executing cut-out processing to the filter length NS set by the filter length setting unit 114 and rounding processing performed by a window function on the filter coefficient CP of the minimum phase FIR filter FP.

Processing of the coefficient generation unit 115 is described with reference to FIG. 5.

The error calculation unit 116 calculates an error ER of a frequency characteristic corresponding to the approximation filter FA with respect to the frequency characteristic of the frequency domain filter FF.

When the error ER is equal to or less than a predetermined threshold value ERA, the error calculation unit 116 causes the filter storage unit 118 to store the filter coefficient CA of the approximation filter FA therein as the filter coefficient CN that specifies the new filter FN.

When the error ER is not equal to or less than the predetermined threshold value ERA, the error calculation unit 116 causes the filter length setting unit 114 to set the filter length NS that is longer than the set filter length NS. For example, when the set filter length NS is 256, the filter length setting unit 114 is caused to set 512 as the filter length NS. For example, when the set filter length NS is 512, the filter length setting unit 114 is caused to set 1024 as the filter length NS.

The error calculation unit 116 causes the coefficient generation unit 115 to generate the filter coefficient CA of the approximation filter FA that approximates the minimum phase FIR filter FL by executing the cut-out processing to the filter length NS set by the filter length setting unit 114 and the rounding processing on the filter coefficient CL of the minimum phase FIR filter FL.

Processing of the error calculation unit 116 is described with reference to FIG. 6 and FIG. 7.

Figure 2:
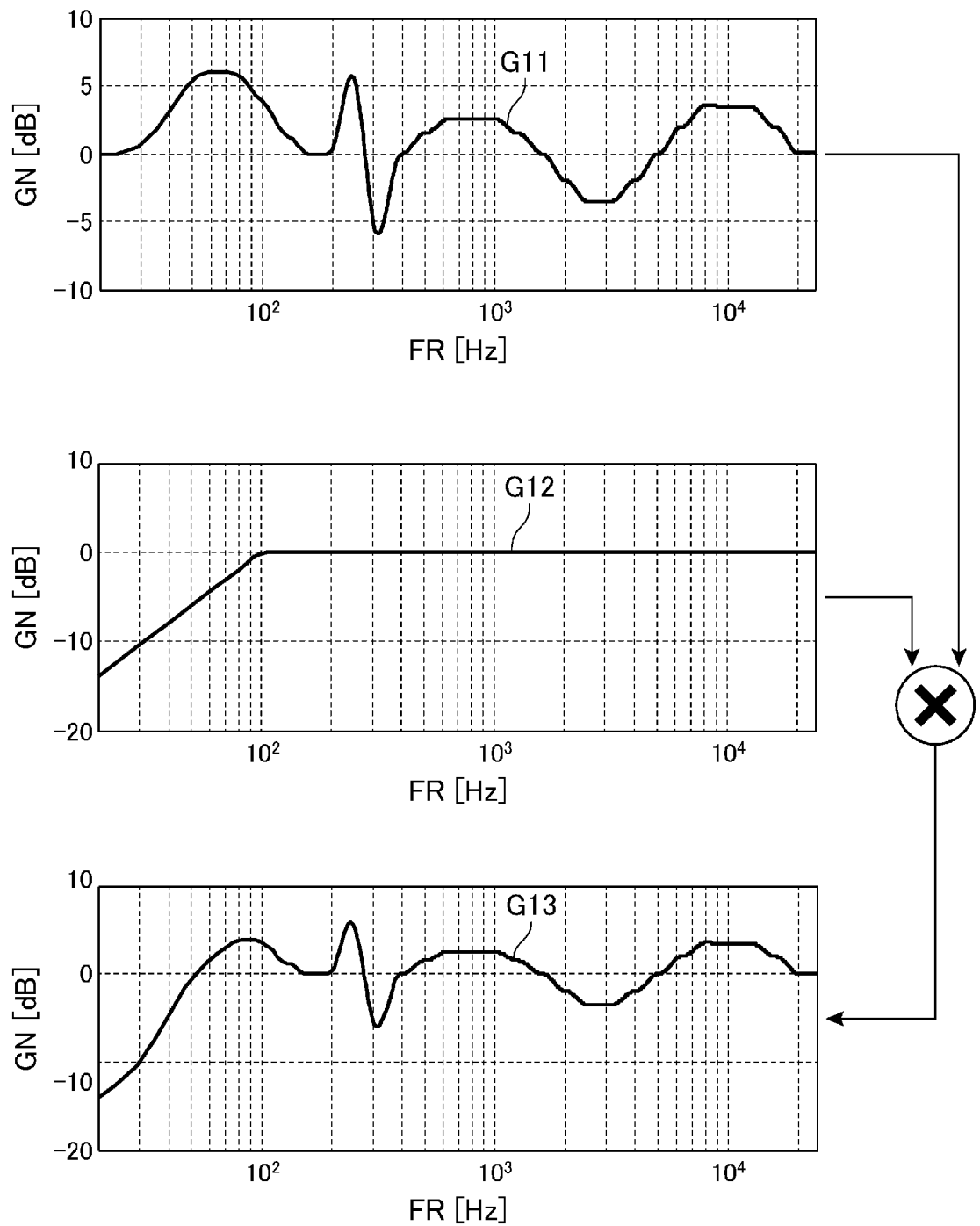
FIG. 2 is a diagram illustrating one example of processing of a coefficient acquisition unit.

FIG. 2 is a diagram showing one example of the processing of the coefficient acquisition unit 111. In each of three graphs shown in FIG. 2, the horizontal axis is a frequency FR, and the vertical axis indicates a gain GN of the frequency domain filter.

The graph shown on the uppermost stage in FIG. 2 is a graph G11 showing the frequency characteristic of the first frequency domain filter FF1. The first frequency domain filter FF1 is a filter that corrects the amplitude for each frequency. The graph G11 corresponds to the filter coefficient CF1 that specifies the frequency characteristic of the first frequency domain filter FF1.

The graph shown on the middle stage in FIG. 2 is a graph G12 showing the frequency characteristic of the second frequency domain filter FF2. The second frequency domain filter FF2 is a filter that divides a frequency band.

For example, the second frequency domain filter FF2 is a filter that reduces a low-frequency component. The graph G12 corresponds to the filter coefficient CF2 that specifies the frequency characteristic of the second frequency domain filter FF2.

The graph shown on the lower stage in FIG. 2 is a graph G13 showing the frequency characteristic of the frequency domain filter FF. The filter coefficient CF that specifies the frequency characteristic of the frequency domain filter FF is acquired by multiplying the filter coefficient CF1 that specifies the frequency characteristic of the first frequency domain filter FF1 and the filter coefficient CF2 that specifies the frequency characteristic of the second frequency domain filter FF2 together for each corresponding frequency by the coefficient acquisition unit 111.

In the present embodiment, a case where the second frequency domain filter FF2 is a filter that reduces a low-frequency component is described, but the present invention is not limited thereto. The second frequency domain filter FF2 only needs to be a filter that divides a frequency band.

When the filter generation apparatus 1 generates an audio signal output to a woofer mounted on the vehicle, for example, the second frequency domain filter FF2 is a filter that reduces a medium-frequency component and a high-frequency component.

When the filter generation apparatus 1 generates an audio signal output to a squawker mounted on the vehicle, for example, the second frequency domain filter FF2 is a filter that reduces a low-frequency component and a high-frequency component.

When the filter generation apparatus 1 generates an audio signal output to a tweeter mounted on the vehicle, for example, the second frequency domain filter FF2 is a filter that reduces a low-frequency component and a medium-frequency component.

As above, the second frequency domain filter FF2 only needs to divide the frequency band in accordance with the type of the speaker to which the filter FN generated by the filter generation apparatus 1 outputs the audio signal.

FIG. 3 shows graphs showing one example of the linear phase FIR filter FL.

The linear phase FIR filter FL shown in FIG. 3 is acquired by performing IFFT on the frequency characteristic of the frequency domain filter FF shown in FIG. 2 by the coefficient calculation unit 112. When fast Fourier transform (FFT) is performed with a sampling frequency of 48 kHz and 8192 sampling points SM, the number of the sampling points SM of the linear phase FIR filter FL acquired by performing IFFT is 8192.

In FIG. 3, the horizontal axis indicates the sampling points SM of the linear phase FIR filter FL, and the vertical axis indicates an amplitude AT corresponding to the filter coefficient CL of the linear phase FIR filter FL. The values of the sampling points SM are from 1 to 8192.

The linear phase FIR filter FL is a system in which the phase is linear, and has a bilaterally symmetrical characteristic as shown in a graph G21 on the upper stage in FIG. 3.

A graph shown on the lower stage in FIG. 3 is a graph G22 in which a range in which the values of the sampling points SM are in the neighborhood of "4097 (=8192/2+1)", for example, a range in which the values of the sampling points SM are from 4000 to 4200 in the graph G21 shown on the upper stage in FIG. 3 is enlarged.

As shown in the graph G22, the linear phase FIR filter FL has a bilaterally symmetrical waveform about the position in which the value of the sampling point SM that is the horizontal axis is "4097".

FIG. 4 shows graphs showing one example of the minimum phase FIR filter FP.

The minimum phase FIR filter FP is acquired by converting the linear phase FIR filter FL by the conversion unit 113. In this processing, as it is well known, the minimum phase FIR filter FP is acquired by applying window processing in a cepstrum domain after a real number cepstrum is acquired.

In FIG. 4, the horizontal axis indicates the sampling points SM of the linear phase FIR filter FL, and the vertical axis indicates the amplitude AT corresponding to the filter coefficient CL of the linear phase FIR filter FL.

The minimum phase FIR filter FP is a system with less delay, and can approximate a characteristic with less degrees.

A graph shown on the lower stage in FIG. 4 is a graph G32 obtained by enlarging a range in which the values of the sampling points SM are in the neighborhood of "1", for example, a range in which the values of the sampling points SM are from 1 to 254 in a graph G31 shown on the upper stage in FIG. 4.

As shown in the graph G32, the minimum phase FIR filter FP is a waveform having the amplitude AT that is a main feature of the characteristic of the minimum phase FIR filter FP in the neighborhood of a place where the value of the sampling point SM is "1". Therefore, the minimum phase FIR filter FP can approximate the characteristic with less degrees. This point is described with reference to FIG. 6 to FIG. 8.

Figure 5:
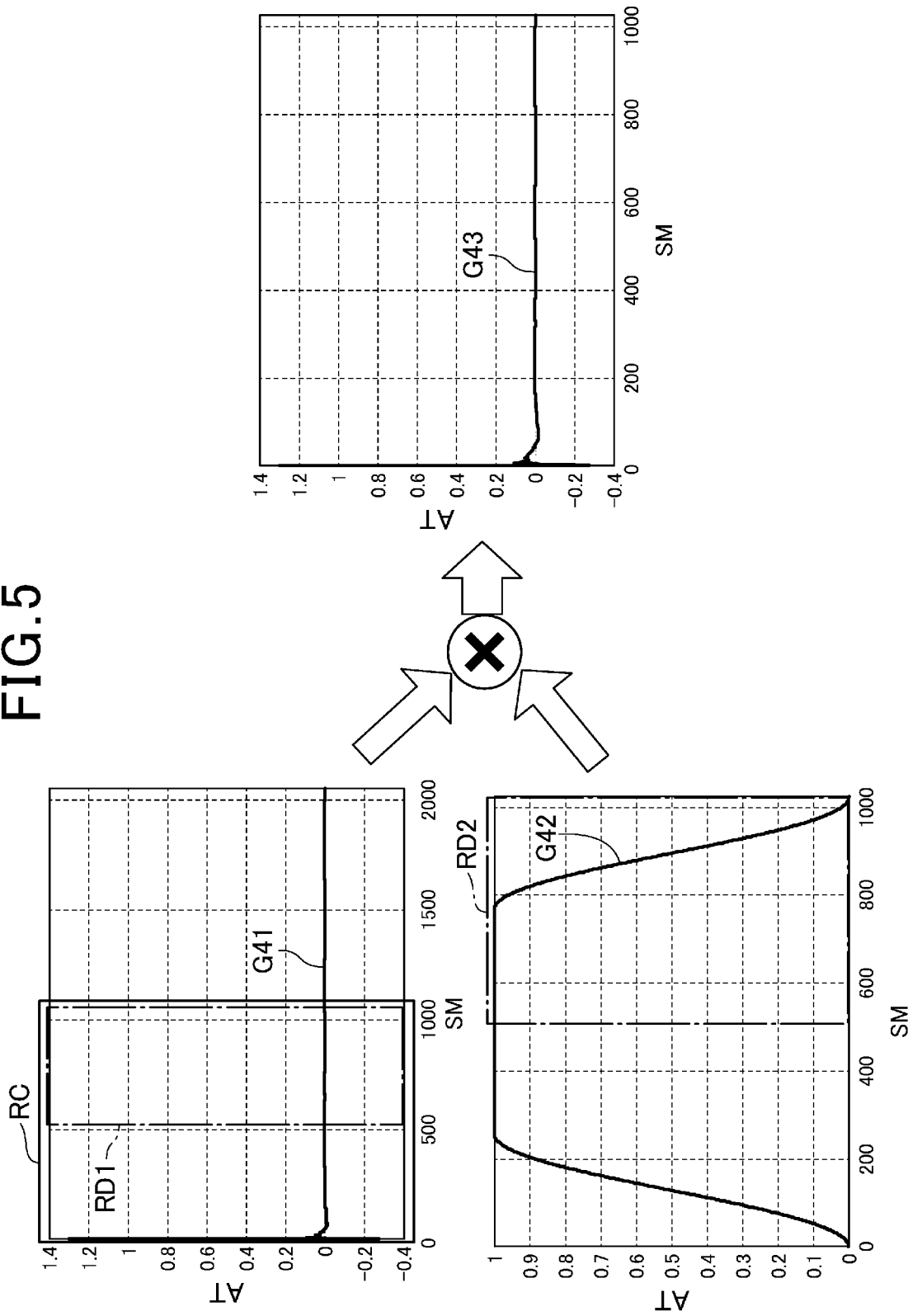
FIG. 5 shows graphs showing one example of cut-out processing and rounding processing performed by a coefficient generation unit.

FIG. 5 shows graphs showing one example of the cut-out processing and the rounding processing performed by the coefficient generation unit 115.

In FIG. 5, a case where the filter length setting unit 114 sets 1024 as the filter length NS is described.

A diagram on the upper-left stage in FIG. 5 shows a range RC in which the cut-out processing is performed and a range RD1 in which the rounding processing is performed out of the minimum phase FIR filter FP.

In the diagram on the upper-left stage in FIG. 5, the horizontal axis indicates the sampling points SM of the minimum phase FIR filter FP, and the vertical axis indicates the amplitude AT corresponding to the filter coefficient CP of the minimum phase FIR filter FP. A graph G41 that is the diagram on the upper-left stage in FIG. 5 shows the filter coefficient CP of the minimum phase FIR filter FP.

The range RC is a range in which the sampling points SM are from "1" to "1024".

The range RD1 is a range in which the sampling points SM are from "513" to "1024".

A diagram on the lower-left stage in FIG. 5 shows a window function used in the rounding processing and a range RD2 in which the rounding processing is performed.

In the diagram on the lower-left stage in FIG. 5, the horizontal axis of indicates the sampling points SM of the window function, and the vertical axis indicates the amplitude AT of the window function. A graph G42 indicates the window function. In the present embodiment, the window function is a Tukey window, and a value of a parameter r that specifies the Tukey window is set to "0.5".

The coefficient generation unit 115 cuts out the filter coefficients CP of the minimum phase FIR filter FP at which the sampling points SM are in the range RC as the cut-out processing.

The coefficient generation unit 115 executes, as the rounding processing, processing of multiplying each of the filter coefficients CP of the minimum phase FIR filter FP at which the sampling points SM are in the range RD1 by the value of the window function at which the sampling points SM are in the range RD2.

As a result, the approximation filter FA of the minimum phase FIR filter FP shown on the right side in FIG. 5 is acquired. In the diagram on the right side in FIG. 5, the horizontal axis indicates the sampling point SM of the approximation filter FA, and the vertical axis indicates the amplitude AT of the approximation filter FA. A graph G43 shows the approximation filter FA.

Figure 6:
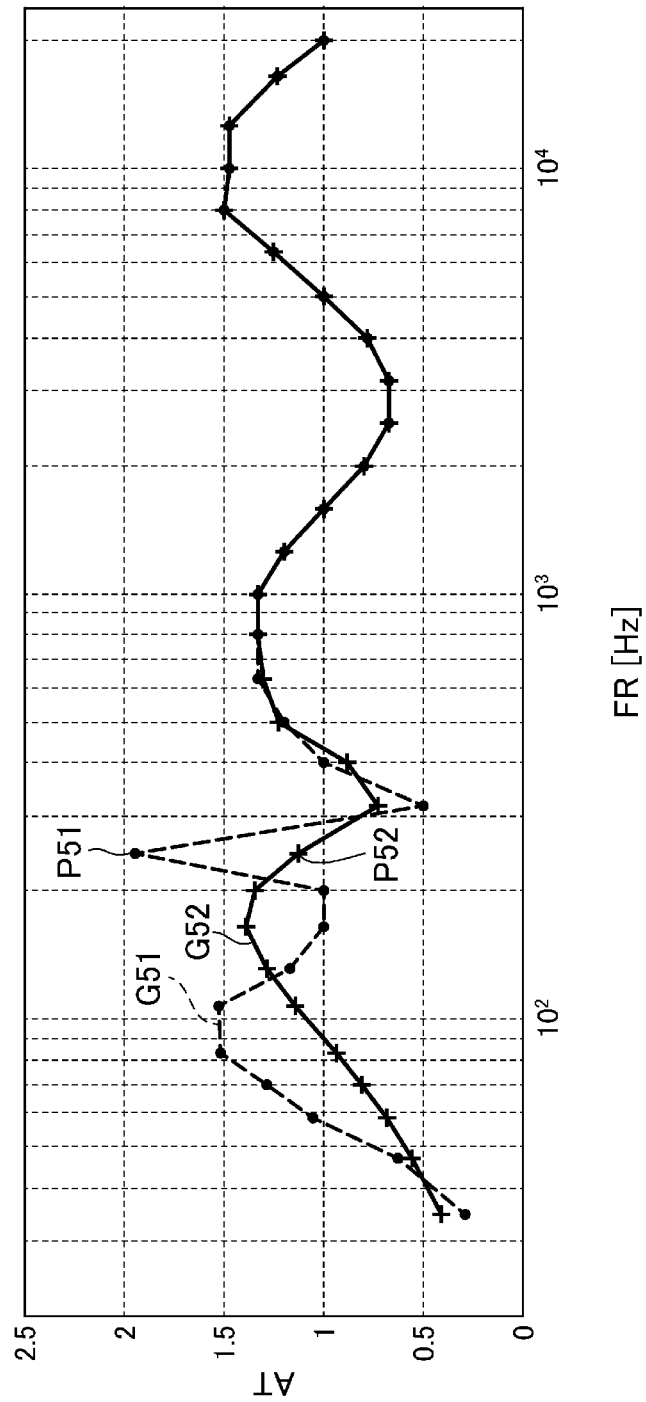
FIG. 6 shows graphs showing one example of processing performed by an error calculation unit.
Figure 7:
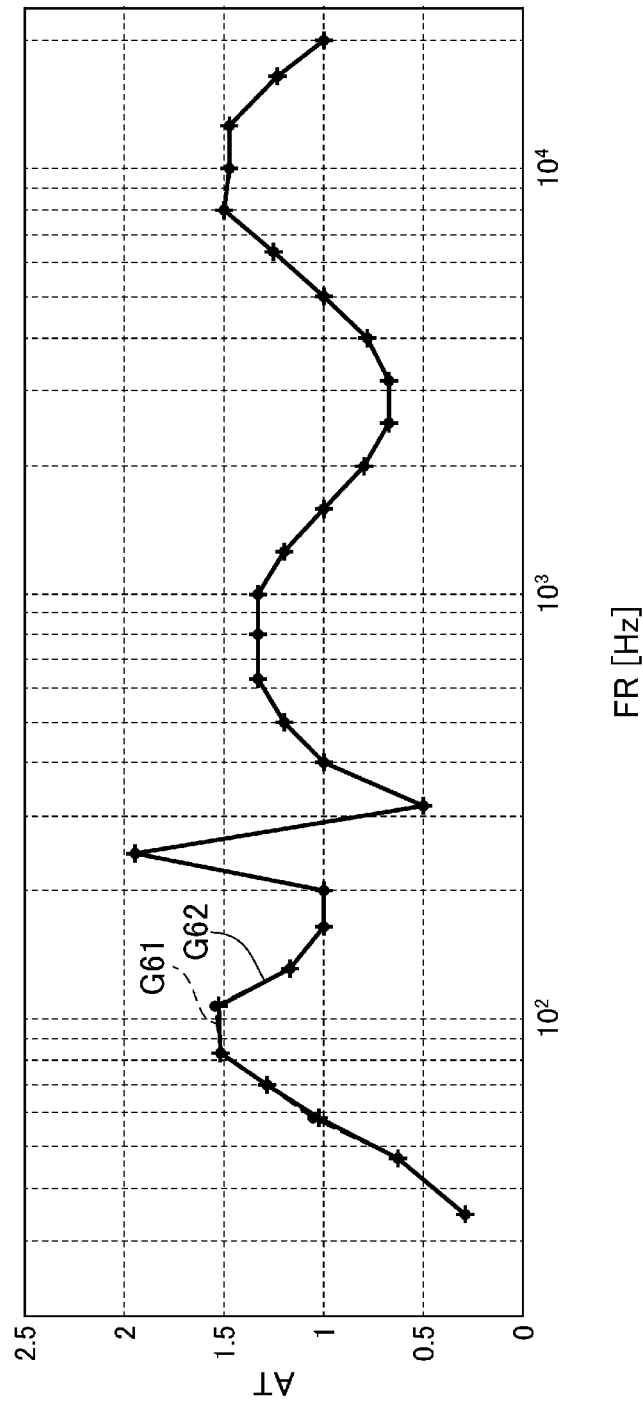
FIG. 7 shows graphs showing another example of processing performed by the error calculation unit.
Figure 8:
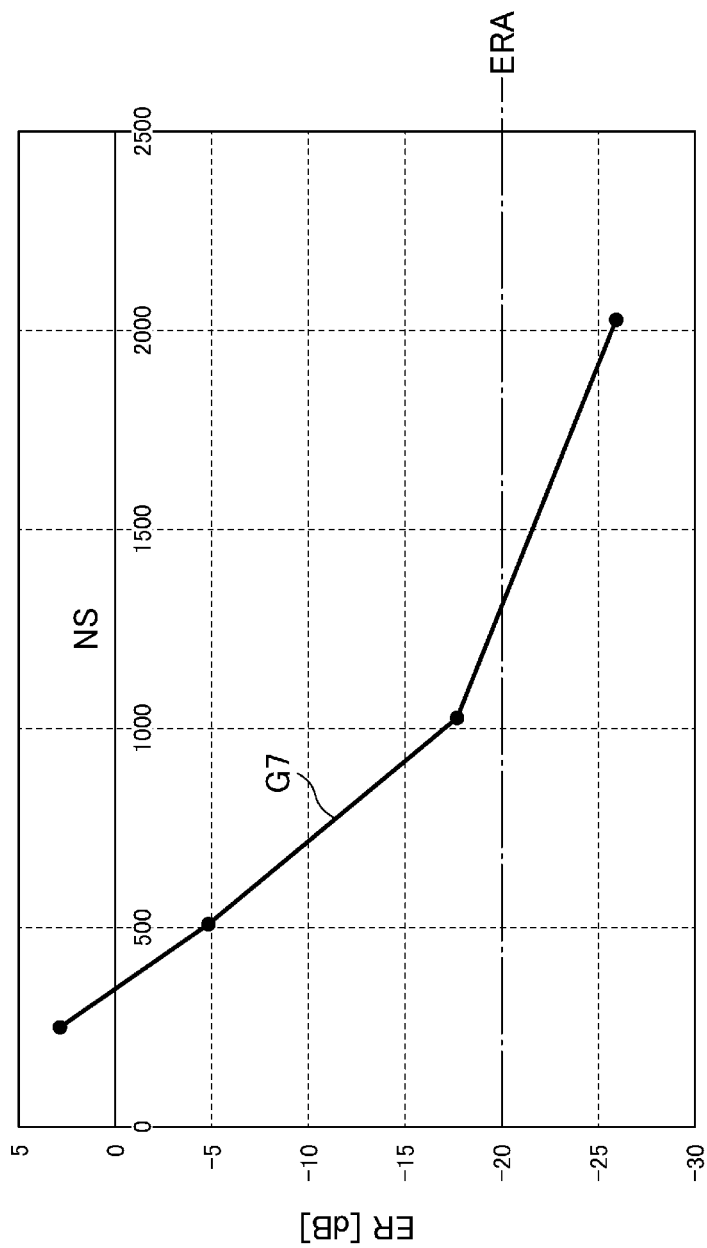
FIG. 8 is a graph showing one example of a relationship between a filter length and an error.

Next, with reference to FIG. 6 to FIG. 8, the processing of the error calculation unit 116 is described.

First, the error calculation unit 116 calculates the frequency characteristic corresponding to the approximation filter FA by performing fast Fourier transform (FFT) on the approximation filter FA generated by the coefficient generation unit 115.

A difference between the frequency characteristic corresponding to the approximation filter FA and the frequency characteristic of the frequency domain filter FF is calculated as the error ER.

In the present embodiment, FFT and IFFT are executed by setting the sampling frequency to 48 kHz and the number of sampling points to 8192. In other words, the frequency resolution is about 5.85 (=48000/8192) Hz.

In the present embodiment, in the calculation of the error ER, the error ER is calculated for 29 sampling points corresponding to a plurality of (in the present embodiment, 29) specific frequencies close to a center frequency of ⅓ of an octave from 4096 data indicating the frequency characteristic of the frequency domain filter FF.

For example, in a section from 100 Hz to 1 kHz, 10 points, that is, 105.4 Hz, 128.9 Hz, 164.0 Hz, 199.2 Hz, 246.0 Hz, 316.4 Hz, 398.4 Hz, 503.9 Hz, 632.8 Hz, and 802.7 Hz are the sampling points corresponding to the "specific frequencies".

FIG. 6 shows graphs showing one example of processing performed by the error calculation unit 116 when the filter length NS of the approximation filter FA is 256 points. In FIG. 6, the horizontal axis is the frequency FR, and the vertical axis is the amplitude AT.

A graph G51 that is a broken line shows the frequency characteristic of the frequency domain filter FF. A graph G52 that is a solid line shows the frequency characteristic of the approximation filter FA. A point P51 is a point close to a specific frequency of the graph G51 that is the broken line, and a point P52 is a point close to a specific frequency corresponding to the point P51 in the graph G52 that is the solid line.

When values of the amplitudes AT of 29 points P51 are expressed by a variable $Xn$ (n=1 to 29), and values of the amplitudes AT of 29 points P52 are expressed by a variable $Yn$ (n=1 to 29), the error ER can be obtained by the following expression (1).

$$ER = (\Sigma (Xn-Yn)^2)^{1/2} \tag{1}$$

Here, $\Sigma$ expresses a sum for 29 points, in other words, a sum of squares of a difference between the variable $Xn$ and the variable $Yn$ corresponding to each of n=1 to 29.

When the filter length NS is 256 points, the error ER calculated by the error calculation unit 116 is "1.3858".

FIG. 7 shows graphs showing one example of processing performed by the error calculation unit 116 when the filter length NS of the approximation filter FA is 2048 points. In FIG. 7, the horizontal axis is the frequency FR, and the vertical axis is the amplitude AT.

A graph G61 that is a broken line shows the frequency characteristic of the frequency domain filter FF. A graph G62 that is a solid line shows the frequency characteristic corresponding to the approximation filter FA.

The method of calculating the error ER is the same as the method described with reference to FIG. 6.

When the filter length NS is 2048 points, the error ER calculated by the error calculation unit 116 is "0.0509".

FIG. 8 is a graph showing one example of a relationship between the filter length NS of the approximation filter FA and the error ER. In FIG. 8, the horizontal axis is the filter length NS of the approximation filter FA, and the vertical axis is the error ER calculated by the error calculation unit 116.

A graph G7 shows the relationship between the filter length NS and the error ER. As shown in the graph G7, the error ER decreases as the filter length NS becomes longer. The predetermined threshold value ERA is −20 (dB), for example.

Therefore, when the filter length NS set by the filter length setting unit 114 reaches 2048 points, the error ER becomes equal to or less than the predetermined threshold value ERA. Thus, the error calculation unit 116 causes the filter storage unit 118 to store the filter coefficient CA of the approximation filter FA of which filter length NS is 2048 points therein as the filter coefficient CN that specifies the new filter FN.

FIG. 11 shows graphs showing one example of a filter processing result obtained by the linear phase FIR filter FP of a related art. In FIG. 11, a case where the linear phase FIR filter FP is the linear phase FIR filter FP shown in FIG. 3 is described. In FIG. 11, the horizontal axis is time TM (sec), and the vertical axis is the amplitudes AT of an input signal to the linear phase FIR filter FP and an output signal from the linear phase FIR filter FP.

A graph G91 shown by a broken line shows the input signal to the linear phase FIR filter FP, and a graph G92 shown by a solid line shows the output signal from the linear phase FIR filter FP.

As shown on the upper stage in FIG. 11, the input signal to the linear phase FIR filter FP is a pulse wave. The output signal from the linear phase FIR filter FP is delayed with respect to the input signal to the linear phase FIR filter FP by delay time TD. The delay time TD is 0.12 seconds, for example.

A diagram on the lower stage in FIG. 11 is a graph obtained by enlarging the neighborhood of a peak value of the output signal from the linear phase FIR filter FP in the horizontal axis direction. As shown by a graph G93, the output signal from the linear phase FIR filter FP includes a domain PR in which the amplitude is not "0" before a peak signal PP. Therefore, pre-ringing, in other words, pre-echo occurs in audio output from the speaker to which the output signal from the linear phase FIR filter FP is input.

FIG. 9 shows graphs showing one example of a filter processing result obtained by the approximation filter FA stored in the filter storage unit 118 as the new filter FN. In FIG. 9, the horizontal axis indicates the time TM (sec), and the vertical axis indicates the amplitudes AT of an input signal to the approximation filter FA and an output signal from the approximation filter FA.

A graph G81 shown by a broken line is the input signal to the approximation filter FA, and a graph G82 shown by a solid line is the output signal from the approximation filter FA. The input signal to the approximation filter FA is a pulse wave.

In a diagram on the upper stage in FIG. 9, most of the waveform of the graph G81 and most of the waveform of the graph G82 overlap with each other. A peak position of the waveform of the graph G81 and a peak position of the waveform of the graph G82 match each other.

In other words, the delay time TD as that in FIG. 11 is not generated.

A diagram on the lower stage in FIG. 9 is a graph obtained by enlarging the neighborhood of a peak value of the output signal from the approximation filter FA in the horizontal axis direction.

As shown in a graph G83, the output signal from the approximation filter FA does not include a domain in which the amplitude is not "0" before the peak signal PP. Therefore, pre-ringing, in other words, pre-echo does not occur in audio output from the speaker to which the output signal from the approximation filter FA is input.

As described with reference to FIG. 9 and FIG. 11, regarding the output signal from the approximation filter FA, a delay is not generated with respect to the input signal to the approximation filter FA, and pre-ringing, in other words, pre-echo does not occur either. Therefore, the approximation filter FA can generate an output signal with satisfactory quality.

Figure 10:
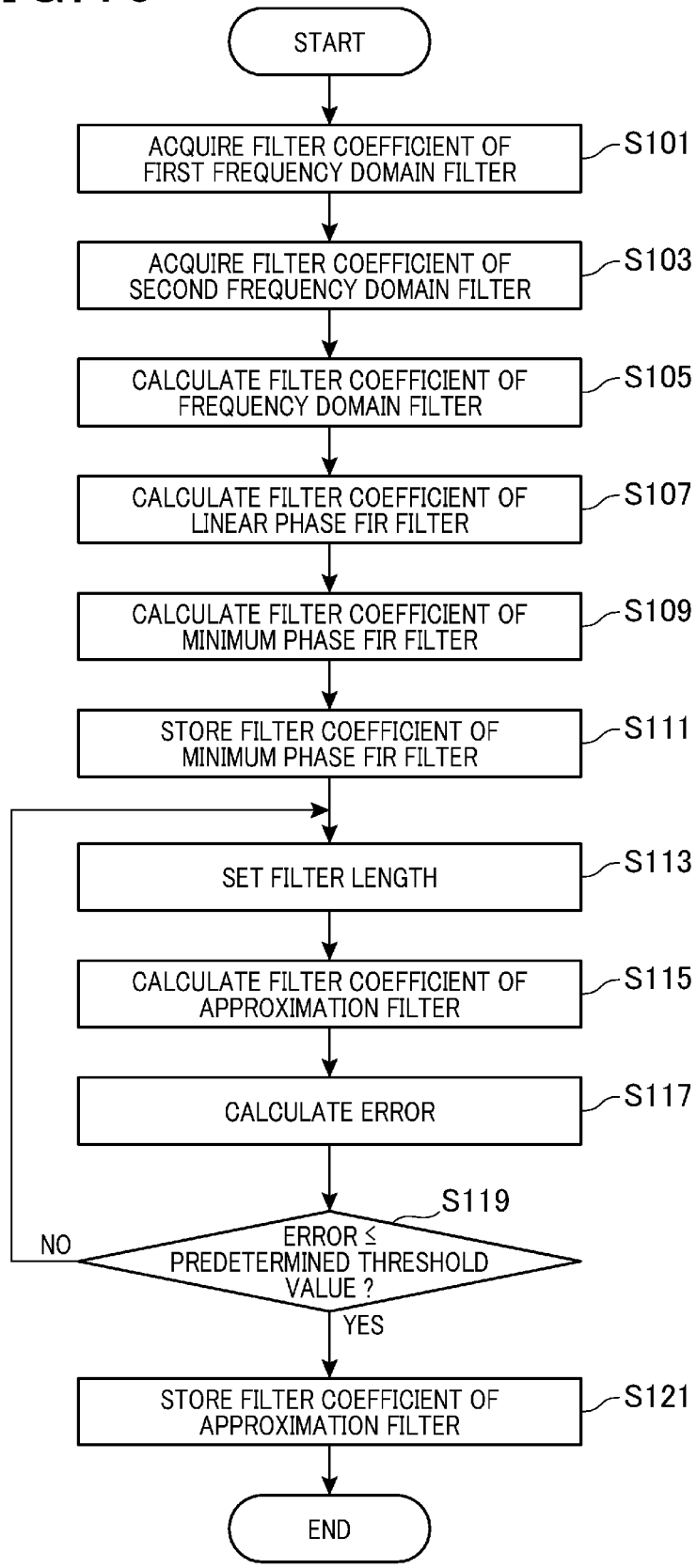
FIG. 10 is a flowchart illustrating one example of processing of a control unit.

FIG. 10 is a flowchart illustrating one example of processing of the control unit 11.

As illustrated in FIG. 10, first, in Step S101, the coefficient acquisition unit 111 acquires the filter coefficient CF1 that specifies the frequency characteristic of the first frequency domain filter FF1.

Next, in Step S103, the coefficient acquisition unit 111 acquires the filter coefficient CF2 that specifies the frequency characteristic of the second frequency domain filter FF2.

Next, in Step S105, the coefficient acquisition unit 111 multiplies the filter coefficient CF1 and the filter coefficient CF2 together for each corresponding frequency and calculates the filter coefficient CF that specifies the frequency characteristic of the frequency domain filter FF.

Next, in Step S107, the coefficient calculation unit 112 performs IFFT on the frequency characteristic of the frequency domain filter FF and calculates the filter coefficient CL of the linear phase FIR filter FL of the time domain.

Next, in Step S109, the conversion unit 113 calculates the filter coefficient CP of the minimum phase FIR filter FP by converting the filter coefficient CL of the linear phase FIR filter FL to the filter coefficient CP of the minimum phase FIR filter FP.

Next, in Step S111, the conversion unit 113 causes the coefficient storage unit 117 to store the filter coefficient CP of the minimum phase FIR filter FP therein.

Next, in Step S113, the filter length setting unit 114 sets the filter length NS. The filter length setting unit 114 sets the number of coefficients configuring the filter coefficient CA of the approximation filter FA to 256, for example, as the filter length NS.

Next, in Step S115, the coefficient generation unit 115 generates the filter coefficient CA of the approximation filter FA that approximates the minimum phase FIR filter FP. Specifically, the coefficient generation unit 115 generates the filter coefficient CA of the approximation filter FA that approximates the minimum phase FIR filter FP by reading out the filter coefficient CP of the minimum phase FIR filter FP from the coefficient storage unit 117 and executing the cut-out processing to the filter length NS set by the filter length setting unit 114 and the rounding processing performed by the window function on the filter coefficient CP of the minimum phase FIR filter FP.

Next, in Step S117, the error calculation unit 116 calculates the error ER of the frequency characteristic corresponding to the approximation filter FA with respect to the frequency characteristic of the frequency domain filter FF. Specifically, the error calculation unit 116 calculates the error ER for 29 sampling points corresponding to a plurality of specific frequencies close to the center frequency of ⅓ of an octave from 4096 pieces of data indicating the frequency characteristic of the frequency domain filter FF in the calculation of the error ER. The error ER is calculated by abovementioned Expression (1) described with reference to FIG. 6.

Next, in Step S119, the error calculation unit 116 determines whether the error ER is equal to or less than the predetermined threshold value ERA. The predetermined threshold value ERA is −20 (dB), for example.

When the error calculation unit 116 determines that the error ER is not equal to or less than the predetermined threshold value ERA (Step S119; NO), the processing returns to Step S113. In Step S113, the filter length NS that is longer than the set filter length NS is set by the filter length setting unit 114, and the processing of Step S115 to Step S119 is executed again.

When the error calculation unit 116 determines that the error ER is equal to or less than the predetermined threshold value ERA (Step S119; YES), the processing proceeds to Step S121.

In Step S121, the error calculation unit 116 causes the filter storage unit 118 to store the filter coefficient CA of the approximation filter FA therein as the filter coefficient CN that specifies the new filter FN. Then, the processing ends.

As above, as described with reference to FIG. 1 to FIG. 11, the filter generation apparatus 1 of the present embodiment includes: the coefficient acquisition unit 111 that acquires the filter coefficient CF that specifies the frequency characteristic of the frequency domain filter FF; the coefficient calculation unit 112 that performs IFFT on the frequency characteristic of the frequency domain filter FF and calculates the filter coefficient CL of the linear phase FIR filter FL of the time domain; the conversion unit 113 that converts the filter coefficient CL of the linear phase FIR filter FL to the filter coefficient CP of the minimum phase FIR filter FP; the coefficient storage unit 117 that stores the filter coefficient CP of the minimum phase FIR filter FP in the coefficient storage unit 117; the filter length setting unit 114 that sets the filter length NS; the coefficient generation unit 115 that generates the filter coefficient CA of the approximation filter FA by reading out the filter coefficient CP of the minimum phase FIR filter FP from the coefficient storage unit 117 and executing the cut-out processing to the filter length NS set by the filter length setting unit 114 and the rounding processing performed by the window function on the filter coefficient CP of the minimum phase FIR filter FP, the approximation filter FA approximating the minimum phase FIR filter FP; the error calculation unit 116 that calculates the error ER of the frequency characteristic corresponding to the approximation filter FA with respect to the frequency characteristic of the frequency domain filter FF; and the filter storage unit 118 that stores the filter coefficient CA of the approximation filter FA in the filter storage unit 118 as the filter coefficient CN that specifies the new filter FN when the error ER is equal to or less than the predetermined threshold value ERA.

In other words, the filter coefficient CA of the approximation filter FA that approximates the minimum phase FIR filter FP is generated by reading out the filter coefficient CP of the minimum phase FIR filter FP and executing the cut-out processing to the set filter length NS and the rounding processing performed by the window function on the filter coefficient CP of the minimum phase FIR filter FP. When the error ER is equal to or less than the predetermined threshold value ERA, the filter coefficient CA of the approximation filter FA is stored as the filter coefficient CN that specifies the new filter FN.

Therefore, by suitably setting the filter length NS, the filter coefficient CA of the approximation filter FA that suitably approximates the minimum phase FIR filter FP can be generated. Therefore, the capacity of the memory that stores the filter coefficient therein can be reduced.

As described with reference to FIG. 9 and FIG. 11, a case where the output signal is delayed with respect to the input signal as in the linear phase FIR filter FP can be suppressed and the occurrence of pre-ringing, in other words, pre-echo can be suppressed.

The filter coefficient CF that specifies the frequency characteristic of the frequency domain filter FF is calculated by multiplying the filter coefficient CF1 that specifies the frequency characteristic of the first frequency domain filter FF1 and the filter coefficient CF2 that specifies the frequency characteristic of the second frequency domain filter FF2 different from the first frequency domain filter FF1 together for each corresponding frequency.

Therefore, the filter coefficient CF of the frequency domain filter FF having the frequency characteristic obtained by combining the frequency characteristic of the first frequency domain filter FF1 and the frequency characteristic of the second frequency domain filter FF2 can be calculated. Thus, the filter coefficient CF of the frequency domain filter FF having the frequency characteristic that is even more suitable can be calculated by suitably setting the frequency characteristic of the first frequency domain filter FF1 and the frequency characteristic of the second frequency domain filter FF2.

The first frequency domain filter FF1 is a filter that corrects the amplitude for each frequency, and the second frequency domain filter FF2 is a filter that divides the frequency band.

Therefore, as the frequency domain filter FF, the filter coefficient CF having the frequency characteristic that corrects the amplitude for each frequency and divides the frequency band can be calculated. Therefore, the filter coefficient CF of the frequency domain filter FF having the frequency characteristic that is more suitable than those of the first frequency domain filter FF1 and the second frequency domain filter FF2 can be calculated.

When the error ER is not equal to or less than the predetermined threshold value ERA, the error calculation unit 116 causes the filter length setting unit 114 to set the filter length NS that is longer than the set filter length NS, and causes the coefficient generation unit 115 to generate the filter coefficient CA of the approximation filter FA by executing the cut-out processing to the filter length NS set by the filter length setting unit 114 and the rounding processing performed by the window function on the filter coefficient CP of the minimum phase FIR filter FP, the approximation filter FA approximating the minimum phase FIR filter FP.

In other words, the filter coefficient CA of the approximation filter FA that approximates the minimum phase FIR filter FP is caused to be generated by causing the filter length NS that is longer than the set filter length NS to be set and executing the cut-out processing to the set filter length NS and the rounding processing performed by the window function.

Therefore, the value of the error ER can be reduced. Thus, the filter coefficient CA of the approximation filter FA that accurately approximates the minimum phase FIR filter FP can be generated.

The error calculation unit 116 calculates errors corresponding to a plurality of specific frequencies, and calculates the error ER from the plurality of calculated errors.

Therefore, the suitable error ER can be calculated by simple calculation by suitably setting each of the plurality of specific frequencies.

Each of the plurality of specific frequencies is a frequency close to a center frequency of ⅓ of an octave.

Therefore, each of the plurality of specific frequencies can be suitably set. Thus, the suitable error ER can be calculated by simple calculation.

The error calculation unit 116 calculates a square root of the sum of squares of the plurality of errors as the error ER.

Therefore, the suitable error ER can be calculated by simple calculation.

The control program PGM of the present embodiment causes the control unit 11 to function as the coefficient acquisition unit 111 that acquires the filter coefficient CF that specifies the frequency characteristic of the frequency domain filter FF, the coefficient calculation unit 112 that performs IFFT on the frequency characteristic of the frequency domain filter FF and calculates the filter coefficient CL of the linear phase FIR filter FL of the time domain, the conversion unit 113 that converts the filter coefficient CL of the linear phase FIR filter FL to the filter coefficient CP of the minimum phase FIR filter FP, the coefficient storage unit 117 that stores the filter coefficient CP of the minimum phase FIR filter FP in the coefficient storage unit 117, the filter length setting unit 114 that sets the filter length NS, the coefficient generation unit 115 that generates the filter coefficient CA of the approximation filter FA by reading out the filter coefficient CP of the minimum phase FIR filter FP from the coefficient storage unit 117 and executing the cut-out processing to the filter length NS set by the filter length setting unit 114 and the rounding processing performed by the window function on the filter coefficient CP of the minimum phase FIR filter FP, the approximation filter FA approximating the minimum phase FIR filter FP; the error calculation unit 116 that calculates the error ER of the frequency characteristic corresponding to the approximation filter FA with respect to the frequency characteristic of the frequency domain filter FF; and the filter storage unit 118 that stores the filter coefficient CA of the approximation filter FA in the filter storage unit 118 as the filter coefficient CN that specifies the new filter FN when the error ER is equal to or less than the predetermined threshold value ERA.

Therefore, the control program PGM of the present embodiment exhibits an effect similar to that of the filter generation apparatus 1 of the present embodiment.

The present embodiment described above merely exemplifies one embodiment of the present invention, and any modifications and applications can be made without departing from the gist of the present invention.

For example, FIG. 1 is a diagram illustrating components by classifying the components in accordance with main processing contents in order to facilitate understanding of the present invention, but the components can be classified into even more components in accordance with the processing contents. Classification can be made such that one component can execute even more processing.

The processing of each component may be executed by one hardware or may be executed by a plurality of hardware.

The processing of each component may be realized by one program or may be realized by a plurality of programs.

In the present embodiment, a case where the filter generation apparatus 1 is configured by a personal computer has been described, but the present invention is not limited thereto. The filter generation apparatus 1 only needs to include a processor and a memory. For example, the filter generation apparatus 1 may be configured by a tablet computer or may be configured by a smartphone.

In the present embodiment, the number of sampling points is 8192, but the present invention is not limited thereto. The number of sampling points only needs to be $2^n$ (n is a natural number). The number of sampling points may be 4096, for example, or the number of sampling points may be 16384, for example.

As the number of sampling points increases, the filter coefficient CL of the linear phase FIR filter FL and the filter coefficient CP of the minimum phase FIR filter FP can be calculated more accurately.

As the number of sampling points decreases, the filter coefficient CL of the linear phase FIR filter FL and the filter coefficient CP of the minimum phase FIR filter FP can be calculated by simpler processing.

In the present embodiment, a case where the window function is a Tukey window has been described, but the present invention is not limited thereto. The window function may be a rectangular window, for example.

In the present embodiment, a case where the value of the parameter r that specifies the Tukey window that is the window function is "0.5" has been described, but the present invention is not limited thereto. The value of the parameter r is preferred to be from 0.25 to 0.75, for example.

In the present embodiment, a case where the predetermined threshold value ERA is −20 dB has been described, but the present invention is not limited thereto. As the predetermined threshold value ERA decreases, the approximation accuracy of the approximation filter FA can be improved. As the predetermined threshold value ERA increases, the filter length NS of the filter coefficient CA of the approximation filter FA can be reduced.

In the present embodiment, a case where the error calculation unit 116 calculates the error ER for the sampling points corresponding to the plurality of specific frequencies close to the center frequency of ⅓ of an octave has been described, but the present invention is not limited thereto. The error calculation unit 116 only needs to calculate the error ER of the frequency characteristic corresponding to the approximation filter FA with respect to the frequency characteristic of the frequency domain filter FF. For example, the error calculation unit 116 may calculate the error ER for sampling points corresponding to a plurality of specific frequencies close to a center frequency of ⅙ of an octave. In this case, the error ER that is even more suitable can be calculated. For example, the error calculation unit 116 may calculate the error ER for sampling points corresponding to a plurality of specific frequencies close to a center frequency of 1 octave. In this case, the error ER can be calculated by simple processing.

In the present embodiment, a case where the filter coefficient CN is stored in the audio correction apparatus mounted on the vehicle has been described, but the present invention is not limited thereto. For example, the filter generation apparatus 1 may be mounted on the vehicle. In this case, the filter generation apparatus 1 can generate the suitable filter coefficient CN in accordance with an operation on an equalizer by the user, and can store the suitable filter coefficient CN in the audio correction apparatus mounted on the vehicle.

In the present embodiment, the control program PGM is stored in the memory 11B of the control unit 11 of the filter generation apparatus 1, but the control program PGM can be configured in an aspect of another recording medium or a transmission medium that transmits the control program PGM.

A magnetic or optical recording medium or a semiconductor memory device can be used as the recording medium. Specifically, portable or fixed recording media such as a flexible disk, an HDD, a compact disk read only memory (CD-ROM), a DVD, a Blu-ray (R) Disc, a magneto-optical disk, a flash memory, and a card recording medium are included. The abovementioned recording medium may be a non-volatile storage apparatus such as a RAM, a ROM, and an HDD included in the filter generation apparatus 1.

The filter generation apparatus 1 may download the control program PGM from a server apparatus connected to the filter generation apparatus 1 in a manner in which communication is possible over a network.

For example, processing units of the flowchart illustrated in FIG. 10 are divided in accordance with the main processing contents in order to facilitate understanding of the processing of the control unit 11 of the filter generation apparatus 1, and the present invention is not limited by names and methods of the division of the processing units. The processing of the control unit 11 of the filter generation apparatus 1 may be divided into even more processing units in accordance with the processing content. The processing of the control unit 11 of the filter generation apparatus 1 may be divided such that one processing unit includes even more processing.

REFERENCE SIGNS LIST

1 Filter generation apparatus
11 Control unit (computer)
11A Processor
11B Memory
111 Coefficient acquisition unit
112 Coefficient calculation unit
113 Conversion unit
114 Filter length setting unit
115 Coefficient generation unit
116 Error calculation unit
117 Coefficient storage unit
118 Filter storage unit
12 Operation unit
13 Display unit
14 Storage unit
AT Amplitude
CA, CF, CF1, CF2, CL, CN, CP Filter coefficient
ER Error
ERA Predetermined threshold value FF Frequency domain filter
FF1 First frequency domain filter
FL Linear phase FIR filter
FP Minimum phase FIR filter
FA Approximation filter
FN Filter
FR Frequency
GN Gain
NS Filter length
PGM Control program (filter generation program)
PP Peak signal
PR Domain
RC, RD1, RD2 Range
SM Sampling point
TD Delay time
TM Time
Xn, Yn Variable

What is claimed is:

1. A filter generation apparatus, comprising:
a coefficient acquisition unit that acquires a filter coefficient that specifies a frequency characteristic of a frequency domain filter;
a coefficient calculation unit that performs inverse fast Fourier transform (IFFT) on the frequency characteristic and calculates a filter coefficient of a linear phase finite impulse response (FIR) filter of a time domain;
a conversion unit that converts the filter coefficient of the linear phase FIR filter to a filter coefficient of a minimum phase FIR filter;
a coefficient storage unit that stores the filter coefficient of the minimum phase FIR filter in the coefficient storage unit;
a filter length setting unit that sets a filter length;
a coefficient generation unit that generates a filter coefficient of an approximation filter by reading out the filter coefficient of the minimum phase FIR filter from the coefficient storage unit and executing cut-out processing to the filter length set by the filter length setting unit and rounding processing performed by a window function on the filter coefficient of the minimum phase FIR filter, the approximation filter approximating the minimum phase FIR filter;
an error calculation unit that calculates an error of a frequency characteristic corresponding to the approximation filter with respect to the frequency characteristic of the frequency domain filter; and
a filter storage unit that stores the filter coefficient of the approximation filter in the filter storage unit as a filter coefficient that specifies a new filter when the error is equal to or less than a predetermined threshold value.

2. The filter generation apparatus according to claim 1, wherein the filter coefficient that specifies the frequency characteristic of the frequency domain filter is calculated by multiplying a filter coefficient that specifies a frequency characteristic of a first frequency domain filter and a filter coefficient that specifies a frequency characteristic of a second frequency domain filter different from the first frequency domain filter together for each corresponding frequency.

3. The filter generation apparatus according to claim 2, wherein:
the first frequency domain filter is a filter that corrects an amplitude for each frequency; and
the second frequency domain filter is a filter that divides a frequency band.

4. The filter generation apparatus according to claim 1, wherein, when the error is not equal to or less than the predetermined threshold value, the error calculation unit:
causes the filter length setting unit to set a filter length that is longer than the set filter length; and
causes the coefficient generation unit to generate the filter coefficient of the approximation filter by executing cut-out processing to the filter length set by the filter length setting unit and the rounding processing on the filter coefficient of the minimum phase FIR filter, the approximation filter approximating the minimum phase FIR filter.

5. The filter generation apparatus according to claim 1, wherein the error calculation unit calculates errors corresponding to a plurality of specific frequencies, and calculates the error from the plurality of calculated errors.

6. The filter generation apparatus according to claim 5, wherein each of the plurality of specific frequencies is a frequency close to a center frequency of ⅓ of an octave.

7. The filter generation apparatus according to claim 5, wherein the error calculation unit calculates a square root of a sum of squares of the plurality of errors as the error.

8. A non-transitory computer-readable recording medium having a filter generation program executed by a processor of a computer recorded on the non-transitory computer-readable recording medium, the filter generation program causing the processor to function as:
a coefficient acquisition unit that acquires a filter coefficient that specifies a frequency characteristic of a frequency domain filter;
a coefficient calculation unit that performs inverse fast Fourier transform (IFFT) on the frequency characteristic and calculates a filter coefficient of a linear phase finite impulse response (FIR) filter of a time domain;
a conversion unit that converts the filter coefficient of the linear phase FIR filter to a filter coefficient of a minimum phase FIR filter;
a coefficient storage unit that stores the filter coefficient of the minimum phase FIR filter in the coefficient storage unit;
a filter length setting unit that sets a filter length;
a coefficient generation unit that generates a filter coefficient of an approximation filter by reading out the filter coefficient of the minimum phase FIR filter from the coefficient storage unit and executing cut-out processing to the filter length set by the filter length setting unit and rounding processing performed by a window function on the filter coefficient of the minimum phase FIR filter, the approximation filter approximating the minimum phase FIR filter;
an error calculation unit that calculates an error of a frequency characteristic corresponding to the approximation filter with respect to the frequency characteristic of the frequency domain filter; and
a filter storage unit that stores the filter coefficient of the approximation filter in the filter storage unit as a filter coefficient that specifies a new filter when the error is equal to or less than a predetermined threshold value.

* * * * *